United States Patent
Xie et al.

(10) Patent No.: US 10,484,085 B2
(45) Date of Patent: Nov. 19, 2019

(54) SIGNAL TRANSMISSION METHOD AND DEVICE, AND TERMINAL

(71) Applicant: Yulong Computer Telecommunication Scientific (Shenzhen) Co., Ltd., Shenzhen, Guangdong (CN)

(72) Inventors: Linfu Xie, Guangdong (CN); Zhenyu Luo, Guangdong (CN)

(73) Assignee: Yulong Computer Telecommuncation Scientific (Shenzhen) Co., Ltd., Shenzhen, Guangdong (CN)

( * ) Notice: Subject to any disclaimer, the term of this patent is extended or adjusted under 35 U.S.C. 154(b) by 120 days.

(21) Appl. No.: 15/320,194

(22) PCT Filed: Jan. 30, 2015

(86) PCT No.: PCT/CN2015/072025
§ 371 (c)(1),
(2) Date: Dec. 19, 2016

(87) PCT Pub. No.: WO2016/106937
PCT Pub. Date: Jul. 7, 2016

(65) Prior Publication Data
US 2017/0155445 A1    Jun. 1, 2017

(30) Foreign Application Priority Data
Dec. 30, 2014   (CN) .......................... 2014 1 0853673

(51) Int. Cl.
*H04M 1/00*    (2006.01)
*H04B 7/26*    (2006.01)
(Continued)

(52) U.S. Cl.
CPC ............... *H04B 7/26* (2013.01); *G01S 19/13* (2013.01); *H04B 1/3827* (2013.01)

(58) Field of Classification Search
None
See application file for complete search history.

(56) References Cited

U.S. PATENT DOCUMENTS 7,010,270 B1 * 3/2006 Thomas ................. H04B 1/109
455/552.1
8,050,245 B2 * 11/2011 Chen ...................... H04B 1/006
370/334
(Continued)

FOREIGN PATENT DOCUMENTS

CN    101114733 A    1/2008
CN    102856633 A    1/2013
(Continued)

OTHER PUBLICATIONS

Extended European search report issued in corresponding European application No. 15874630.5 dated Nov. 24, 2017.

*Primary Examiner* — Tuan A Tran
(74) *Attorney, Agent, or Firm* — Young Basile Hanlon & MacFarlane, P.C.

(57) ABSTRACT

The present disclosure relates to the technical field of communications. Disclosed are a signal transmission method and device, and a terminal, which can improve the reliability of receiving a signal. The present disclosure is applied to a signal transmission system. The signal transmission system comprises: a first antenna and a global system for mobile communications (GSM) transceiver, wherein the GSM transceiver sends a GSM low-frequency signal to the first antenna, and the first antenna receives a GNSS signal and the GSM low-frequency signal sent by the GSM transceiver. The present disclosure is applicable to receiving a GNSS signal and a GSM low-frequency signal by using one antenna.

17 Claims, 2 Drawing Sheets

(51) Int. Cl.
*G01S 19/13* (2010.01)
*H04B 1/3827* (2015.01)

(56) References Cited

U.S. PATENT DOCUMENTS

| | | | |
|---|---|---|---|
| 8,098,205 B2 * | 1/2012 | Rabinovich | H01Q 1/3275 |
| | | | 343/700 MS |
| 2006/0128334 A1 * | 6/2006 | Ikuta | H03G 1/0088 |
| | | | 455/232.1 |
| 2006/0197538 A1 * | 9/2006 | Leinonen | H01Q 1/243 |
| | | | 324/533 |
| 2010/0120466 A1 * | 5/2010 | Li | H04B 1/006 |
| | | | 455/552.1 |
| 2012/0087285 A1 * | 4/2012 | Kitajima | H01P 1/213 |
| | | | 370/297 |
| 2012/0258771 A1 * | 10/2012 | Lei | H01Q 1/243 |
| | | | 455/552.1 |

FOREIGN PATENT DOCUMENTS

| | | |
|---|---|---|
| CN | 103401577 A | 11/2013 |
| CN | 203611894 U | 5/2014 |

* cited by examiner

SIGNAL TRANSMISSION METHOD AND DEVICE, AND TERMINAL

CROSS REFERENCE TO RELATED APPLICATIONS

The present application claims priority to Chinese Patent Application No. 201410853673.1, filed with the Chinese Patent Office on Dec. 30, 2014 and entitled "SIGNAL TRANSMISSION METHOD AND DEVICE, AND TERMINAL", which is hereby incorporated by reference in its entirety.

TECHNICAL FIELD

The present disclosure relates to the technical field of communications, and in particular, to a signal transmission method and device and a terminal.

BACKGROUND

With development of communication technologies, signals received by user equipments become more and more. User equipments may receive Global System for Mobile Communications (GSM) signals, Global Navigation Satellite System (GNSS) signals and so on. The GNSS signals may include Global Positioning System (GPS) signals. In general, an antenna corresponding to GSM and an antenna corresponding to GNSS should be integrated in a user equipment, so as to enable the user equipment to receive GSM signals and GNSS signals. However, the user equipment in which the antenna corresponding to GSM and the antenna corresponding to GNSS are integrated, has a complex structure, and consequently, how to receive GSM signals and GNSS signals by using one antenna becomes a problem to be solved urgently.

In prior art, a signal transmission system comprises: an antenna, a GSM transceiver and a GNSS receiver, The GNSS receiver and the GSM transceiver are coupled to one antenna. The antenna receives GNSS signals and GSM signals sent by the GSM transceiver in different time periods respectively, according to a time division mode.

However, when the antenna receives GSM signals and GNSS signals, since GNSS signals are high-frequency signals and GSM signals includes high-frequency signals, the antenna cannot receive GNSS signals and GSM signals simultaneously, such that the antenna cannot receive the complete GNSS signals, leading to lower the reliability of receiving a signal.

SUMMARY

A signal transmission method and device, and a terminal are provided by the present disclosure, and can improve the reliability of receiving a signal.

According to the first aspect of the present disclosure, a signal transmission method applied to a signal transmission system is provided. The signal transmission system comprises a first antenna and a GSM transceiver. The signal transmission method comprises: sending, by the GSM transceiver, a GSM low-frequency signal to the first antenna; and receiving, by the first antenna, a GNSS signal and the GSM low-frequency signal sent by the GSM transceiver.

According to the second aspect of the present disclosure, a signal transmission device applied to a signal transmission system is provided. The signal transmission system comprises a first antenna and a GSM transceiver. The signal transmission device comprises: a first sending unit used in the GSM transceiver and sending a GSM low-frequency signal to the first antenna; and a first receiving unit used in the first antenna and receiving a GNSS signal and the GSM low-frequency signal sent by the GSM transceiver.

According to the third aspect of the present disclosure, a terminal comprising the signal transmission device according to the second aspect of the present disclosure is provided.

The signal transmission method and device, and the terminal according to the embodiment of the present disclosure are applied to the signal transmission system which comprises the first antenna and the GSM transceiver. The GSM transceiver sends a GSM low-frequency signal to the first antenna, and the first antenna receives a GNSS signal and the GSM low-frequency signal sent by the GSM transceiver. In contrast with prior antennas for receiving GNSS signals and GSM signals, in the embodiment of the present disclosure, the GSM transceiver sends GSM low-frequency signals to the first antenna, while the first antenna can simultaneously receive GNSS signals and GSM low-frequency signals. That is to say, the antenna for receiving GNSS signals and the antenna for sending and receiving GSM low-frequency signals are coupled as one antenna, while the antenna for sending and receiving GSM high-frequency signals is another antenna, thereby avoiding interference problem due to receiving signals of adjacent frequency bands such as GNSS signals, GSM high-frequency signals and so on by using one antenna, and in turn improving the reliability of receiving a signal.

DETAILED DESCRIPTION

In conjunction with the drawings in the embodiments of the present disclosure, a clear, complete description for the technical solutions in the embodiments of the present disclosure is provided below. Apparently, the described embodiments are a part rather than all of the embodiments of the present disclosure. All other embodiments obtained by persons skilled in the art according to the embodiments of the present disclosure without creative efforts should fall within the protection scope of the present disclosure.

Figure 1:
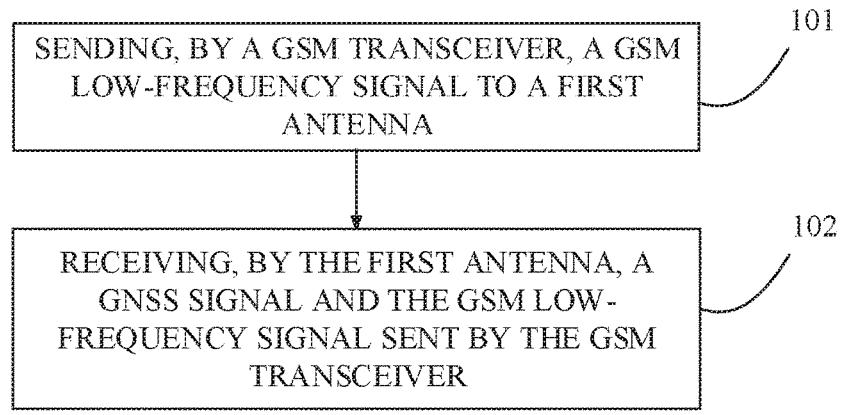
FIG. 1 is a flow diagram of a signal transmission method according to an embodiment of the present disclosure

A signal transmission method is provided by an embodiment of the present disclosure, and is applied to a signal transmission system. The signal transmission system comprises a first antenna and a GSM transceiver, and can improve the reliability of receiving a signal. As shown in FIG. 1, the method comprises the following steps.

Step 101: The GSM transceiver sends a GSM low-frequency signal to the first antenna.

In an embodiment of the present disclosure, the GSM is the Global System for Mobile Communications which is currently the most widely used mobile phone standard. In the embodiment of the present disclosure, the GSM comprises four frequency bands which are 850 MHz (megahertz), 900 MHz, 1800 MHz and 1900 MHz. The 850 MHz frequency band and the 900 MHz frequency band are low-frequency bands, while the 1800 MHz frequency hand and the frequency band 1900 MHz are high-frequency bands.

In an embodiment of the present disclosure, the GSM transceiver is directly connected to four channels which are a GSM low-frequency transmission channel, a GSM low-frequency receipt channel, a GSM high-frequency receipt channel and a GSM high-frequency transmission channel. The four channels are directly connected to one single-pole four-throw switch. The GSM transceiver determines whether to enable one of the channels to be connected by controlling the single-pole four-throw switch. In the embodiment of the present disclosure, the GSM low-frequency transmission channel is composed of a first low-pass filter, a power amplifier, a second low-pass filter and a wire; the GSM low-frequency receipt channel is merely composed of a wire; the GSM high-frequency receipt channel is merely composed of a wire; the GSM high-frequency transmission channel is composed of a power amplifier and a wire. In an embodiment of the present disclosure, if the isolation between the antenna for receiving and sending GSM signals and the antenna for receiving GNSS signals is less than 10dB, a filter may be added in the GSM high-frequency channel. The filter should have an insertion loss greater than 15dB.

For example, when the GSM transceiver is to send a GSM low-frequency signal, the GSM transceiver controls the single-pole four-throw switch, such that the single-pole four-throw switch enables the GSM low-frequency transmission channel to be connected. When the GSM transceiver is to send a high-frequency signal, the GSM transceiver controls the single-pole four-throw switch, such that the single-pole four-throw switch enables the GSM high-frequency transmission channel to be connected.

In an embodiment of the present disclosure, the single-pole four-throw switch is directly connected to a single-pole double-throw switch which is directly connected to two GSM channels. The two GSM channels are a GSM low-frequency channel and a GSM high-frequency channel. In an embodiment of the present disclosure, the GSM transceiver may control the single-pole double-throw switch to determine whether the single-pole double-throw switch enables the GSM low-frequency channel or the GSM high-frequency channel to be connected, In an embodiment of the present disclosure, when the GSM transceiver is to send a GSM low-frequency signal, the GSM transceiver controls the single-pole double-throw switch so as to enable the GSM low-frequency channel to be connected. When the GSM transceiver is to send a GSM high-frequency signal, the GSM transceiver controls the single-pole double-throw switch so as to enable the GSM high-frequency channel to be connected.

Specifically, the GSM low-frequency channel is connected to a frequency divider by the single-pole double-throw switch via a third filter, and the GSM high-frequency channel is directly connected to the GSM high-frequency antenna by the single-pole double-throw switch.

Step 102: The first antenna receives a GNSS signal and the GSM low-frequency signal sent by the GSM transceiver.

In an embodiment of the present disclosure, the GNSS is the Global Navigation Satellite System, and may include: GPS, Beidou and Glonass.

In an embodiment of the present disclosure, the first antenna can receive GNSS signals and GSM low-frequency signals and sends GSM low-frequency signals, simultaneously. In an embodiment of the present disclosure, the GSM transceiver can receive GSM signals sent by GSM base stations.

In an embodiment of the present disclosure, the antenna for receiving GNSS signals and the antenna for receiving and sending GSM low-frequency signals are coupled as one antenna. In an embodiment of the present disclosure, the signals received by the first antenna are mixed signals including GSM low-frequency signals and GNSS signals. The first antenna sends the received mixed signals to the frequency divider which performs frequency division on the mixed signals to obtain GNSS signals and the GSM low-frequency signals, and then the frequency divider sends GNSS signals to a GNSS receiver via a high-pass filter, a first bandpass filter, a low-noise amplifier and a second bandpass filter in sequence, and meanwhile, sends the GSM low-frequency signals to the GSM transceiver via a third low-pass filter.

In an embodiment of the present disclosure, when the GSM transceiver sends a GSM low-frequency signal, the GSM transceiver sends the GSM low-frequency signal to the first antenna via the first low-pass filter, the power amplifier, the second low-pass filter, the third low-pass filter and the frequency divider in sequence. In an embodiment of the present disclosure, the GSM transceiver continuously sends and receives GSM signals, and the GNSS receiver continuously receives GNSS signals.

Figure 2:
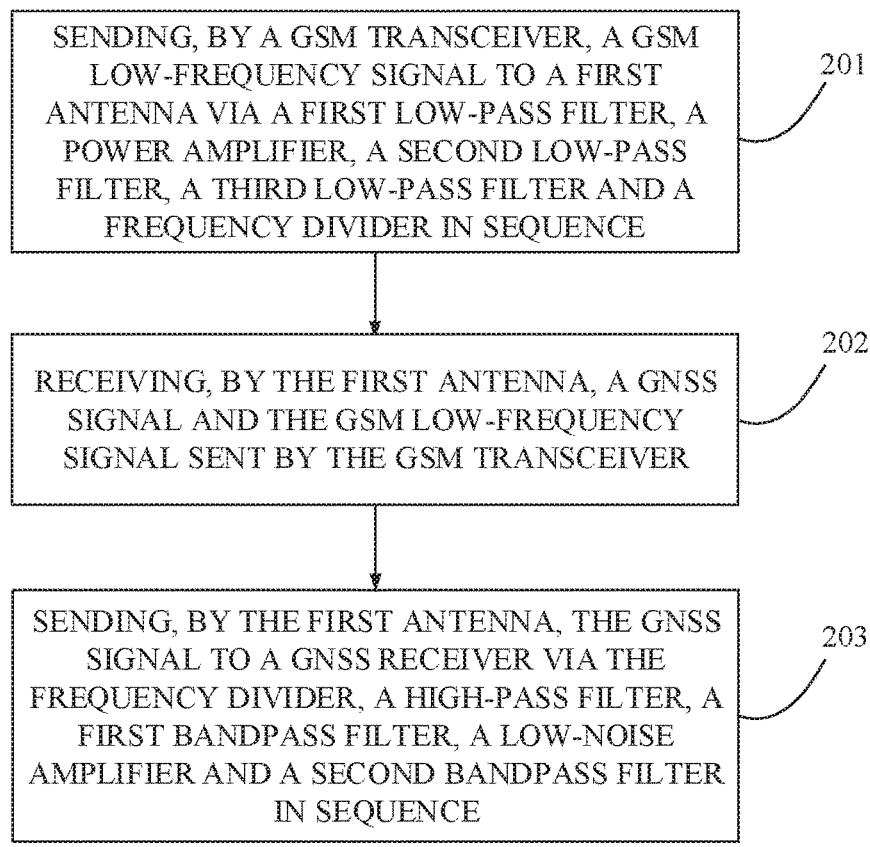
FIG. 2 is a flow diagram of another signal transmission method according to an embodiment of the present disclosure.

The signal transmission method according to the embodiment of the present disclosure is applied to the signal transmission system which comprises the first antenna and the GSM transceiver. The GSM transceiver sends a GSM low-frequency signal to the first antenna, and the first antenna receives a GNSS signal and the GSM low-frequency signal sent by the GSM transceiver. In contrast with prior antennas for receiving GNSS signals and GSM signals, in the embodiment of the present disclosure, the GSM transceiver sends GSM low-frequency signals to the first antenna, while the first antenna can simultaneously receive GNSS signals and GSM low-frequency signals, That is to say, the antenna for receiving GNSS signals and the antenna for sending and receiving GSM low-frequency signals are coupled as one antenna, while the antenna for sending and receiving GSM high-frequency signals is another antenna, thereby avoiding interference problem due to receiving signals of adjacent frequency bands such as GNSS signals, GSM high-frequency signals and so on by using one antenna, and in turn improving the reliability of receiving a signal, As a detailed description of the method as shown in FIG. 1, another signal transmission method is provided by an embodiment of the present disclosure, and is applied to a signal transmission system. The signal transmission system comprises a first antenna and a GSM transceiver, and further comprises a second antenna. As shown in FIG. 2, the method comprises the following steps.

Step 201: The GSM transceiver sends a GSM low-frequency signal to the first antenna via a first low-pass filter, a power amplifier, a second low-pass filter, a third low-pass filter and a frequency divider in sequence.

A total of spurious power corresponding to the GSM transceiver, insertion loss corresponding to the first low-pass filter, gain corresponding to the power amplifier, insertion loss corresponding to the second low-pass filter, insertion loss corresponding to the third low-pass filter and isolation corresponding to the frequency divider is less than or equal to a first preset power.

For example, the first preset power may be −174 dBm, and if the spurious power corresponding to the GSM transceiver is −140 dBm, the insertion loss corresponding to the first low-pass filter is −15 dB, the gain corresponding to the power amplifier is 30 dB, the insertion loss corresponding to the second low-pass filter is −15 dB, the insertion loss corresponding to the third low-pass filter is −15 dB and the isolation corresponding to the frequency divider is −25 dB, then the total of the spurious power corresponding to the GSM transceiver, the insertion loss corresponding to the first low-pass filter, the gain corresponding to the power amplifier, the insertion loss corresponding to the second low-pass filter, the insertion loss corresponding to the third low-pass filter and the isolation corresponding to the frequency divider is −180 dBm less than −174 dBm.

In an embodiment of the present disclosure, the first preset power is a maximum power of spurious signals of the GSM system which interferes with GNSS signals. In an embodiment of the present disclosure, spurious interference is an interference caused by spurious transmission out of a transmission frequency band of a system falling within a receipt frequency band of another system, and directly affects the receiving sensitivity of the system.

In an embodiment of the present disclosure, a total of spurious power corresponding the power amplifier, insertion loss corresponding to the second low-pass filter, insertion loss corresponding to the third low-pass filter and isolation corresponding to the frequency divider is less than or equal to a second preset power.

In an embodiment of the present disclosure, the second preset power is a maximum power of spurious signals within a GNSS frequency band generated by the power amplifier in the GSM low-frequency transmission channel and which cannot interferes with GNSS signals at a common terminal of the frequency divider.

For example, the second preset power may be −174 dBm, and if the spurious power corresponding to the power amplifier is −140 dBm, the insertion loss corresponding to the second low-pass filter is −15 dB, the insertion loss corresponding to the third low-pass filter is −15 dB and the isolation corresponding to the frequency divider is −25 dB, then the total of the spurious power corresponding the power amplifier, the insertion loss corresponding to the second low-pass filter, the insertion loss corresponding to the third low-pass filter and the isolation corresponding to the frequency divider is −195 dBm less than −174 dBm.

In an embodiment of the present disclosure, both of the GSM transceiver and the power amplifier may generate the spurious signals, and by means of adding the first low-pass filter, the power amplifier, the second low-pass filter and the third low-pass filter after the GSM transceiver and setting the insertion loss of these elements in the GNSS signal frequency band, the user equipment enables the spurious power corresponding to the spurious signals at the common terminal of the frequency divider to be less than or equal to the preset power, thereby avoiding the interference of spurious signals with GNSS signals, and in turn, further improving the reliability of receiving a signal.

Step 202: The first antenna receives a GNSS signal and the GSM low-frequency signal sent by the GSM transceiver.

The GNSS signal comprises a GPS signal.

In an embodiment of the present disclosure, the GNSS is the Global Navigation Satellite System, and may include: GPS, Beidou and Glonass.

In an embodiment of the present disclosure, a GNSS signal frequency band is 1.56 GHz (gigahertz) to 1.61 GHz, a frequency corresponding to a GSM low-frequency signal is 850 MHz or 900 MHz, a frequency corresponding to a GSM high-frequency signal is 1800 MHz or 1900 MHz. In an embodiment of the present disclosure, the first antenna receives GNSS signals and GSM low-frequency signals, thereby avoiding failing to perform division on received signals of similar frequencies due to simultaneously receiving the signals, and in turn, preventing GNSS signals received by the user equipment from carrying much interference signals, thereby further improving the reliability of receiving a signal.

Step 203: The first antenna sends the GNSS signal to a GNSS receiver via the frequency divider, a high-pass filter, a first bandpass filter, a low-noise amplifier and a second bandpass filter in sequence.

Optionally, before the step 203, the GSM transceiver sends a GSM high-frequency signal to the second antenna, and then the second antenna receives the GSM-frequency signal sent by the GSM transceiver.

In an embodiment of the present disclosure, the GSM transceiver sends GSM high-frequency signals to the second antenna via the power amplifier. In an embodiment of the present disclosure, the GSM transceiver controls the single-pole four-throw switch and the single-pole double-throw switch such that the single-pole four-throw switch switches to the high-frequency transmission channel and the single-pole double-throw switch switches to the GSM high-frequency channel, thereby enabling the GSM transceiver to send GSM high-frequency signals to the second antenna by the GSM high-frequency transmission channel and the GSM high-frequency channels.

In an embodiment of the present disclosure, by means of setting the maximum transmission power corresponding to the power amplifier in the GSM low-frequency transmission channel, the GSM low-frequency isolation corresponding to the divider, the maximum power corresponding to the first bandpass filter and the power of the first bandpass filter inhibiting GSM low-frequency signals, the user equipment enables the power of GSM signals sent to the input terminal of the low-noise amplifier to be less than the maximum input power corresponding to the low-noise amplifier, thereby avoiding the input saturation of the low-noise filter. In an embodiment of the present disclosure, the power of GSM low-frequency signals coupled to the GNSS channel should be less than the maximum power of the first-stage bandpass filter on the periphery of the GNSS receiver.

For example, if the maximum input power corresponding to the low-power amplifier is 0dBm, the maximum transmission power corresponding to the power amplifier in the GSM low-frequency transmission channel is 34dBm, the GSM low-frequency isolation corresponding to the frequency divider is 25dBm, the maximum power corresponding to the first bandpass filter is 12dBm, the power of the first bandpass filter inhibiting GSM low-frequency signals is 35dBm, then the power of GSM signals sent to the input terminal of the low-noise amplifier is 34dBm−25dBm−35dBm=−26dBm, less than 0dBm, and the setting of the user equipment does not result in the input saturation of the low-noise filter. If the maximum power of the first-stage bandpass filter on the periphery of the GNSS receiver is 12dBm, and the power of GSM low-frequency signals coupled to the GNSS channel is 34dBm−25dBm=9dBm, then the power of GSM low-frequency signals coupled to the GNSS channel is less than the maximum power of the first-stage bandpass filter on the periphery of the GNSS receiver.

In an embodiment of the present disclosure, by means of the design for inhibiting spurious signals and fundamental waves, the user equipment can solve the spurious signal interference and the fundamental wave interference caused by the GSM receiver sending GSM signals, that is to say, the GNSS receiver can receive GNSS signals without interference, thereby further improving the reliability of receiving a signal.

In an embodiment of the present disclosure, if the antenna of the user equipment is merely for receiving GNSS signals or the antenna of the user equipment is merely for sending GSM signals, GSM signals do not interfere with GNSS signals. If the user equipment initiates Assisted Global Positioning System (AGPS) or the user equipment simultaneously receives GNSS signals and GSM high-frequency signals, since the antenna for receiving GNSS signals and the antenna for sending GSM high-frequency signals are two antennas independent of each other, one of the two antennas being arranged at the upper end of the user equipment and the other being arranged at the bottom end of the user equipment, the isolation corresponding to the GNSS signal frequency band is greater than 20 dBm, such that the user equipment can receive GNSS signals without interference.

The signal transmission method according to the embodiment of the present disclosure is applied to the signal transmission system which comprises the first antenna and the GSM transceiver. The GSM transceiver sends a GSM low-frequency signal to the first antenna, and the first antenna receives a GNSS signal and the GSM low-frequency signal sent by the GSM transceiver. In contrast with the prior antennas for receiving GNSS signals and GSM signals, in the embodiment of the present disclosure, the GSM transceiver sends GSM low-frequency signals to the first antenna, while the first antenna. can simultaneously receive GNSS signals and GSM low-frequency signals. That is to say, the antenna for receiving GNSS signals and the antenna for sending and receiving GSM low-frequency signals are coupled as one antenna, while the antenna for sending and receiving GSM high-frequency signals is another antenna, thereby avoiding interference problem due to receiving signals of adjacent frequency bands such as GNSS signals, GSM high-frequency signals and so on by using one antenna, and in turn improving the reliability of receiving a signal.

Furthermore, in the signal transmission method according to the embodiment of the present disclosure, by means of adding the first low-pass filter, the power amplifier, the second low-pass filter and the third low-pass filter after the GSM transceiver and setting the insertion loss of these elements in the GNSS signal frequency band, the user equipment enables the spurious power corresponding to the spurious signals at the common terminal of the frequency divider to be less than the preset power, thereby avoiding the interference of spurious signals with GNSS signals, and in turn, further improving the reliability of receiving a signal. The first antenna receives GNSS signals and GSM low-frequency signals, thereby avoiding failing to perform division on received signals of similar frequencies due to simultaneously receiving the signals, and in turn, preventing GNSS signals received by the user equipment from carrying much interference signals, thereby further improving the reliability of receiving a signal. By means of the design for inhibiting spurious signals and fundamental waves, the user equipment can solve the spurious signal interference and the fundamental wave interference caused by the GSM receiver sending GSM signals, that is to say, the GNSS receiver can receive GNSS signals without interference, thereby further improving the reliability of receiving a signal.

Figure 3:
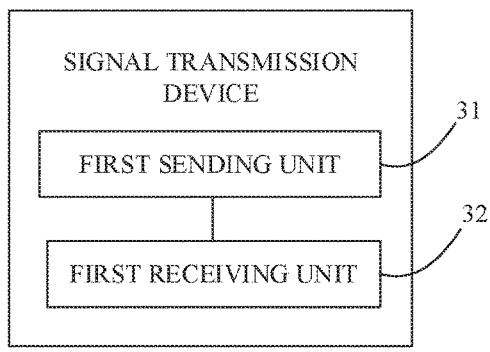
FIG. 3 is a schematic structural diagram of a signal transmission device according to an embodiment of the present disclosure.

As an implementation of the method as shown in FIG. 1 and FIG. 2, a signal transmission device is further provided by an embodiment of the present disclosure. The device may be contained in the user equipment, and is for improving the reliability of receiving a signal. As shown in FIG. 3, the device comprises a first sending unit 31 and a first receiving unit 32.

The first sending unit 31 is used in a GSM transceiver, and sends a GSM low-frequency signal to a first antenna.

The first receiving unit 32 is used in the first antenna, and receives a GNSS signal and the GSM low-frequency signal sent by the GSM transceiver.

The GNSS signal comprises a GPS signal.

The first sending unit 31 is further used in the GSM transceiver, and sends a GSM high-frequency signal to a second antenna.

Figure 4:
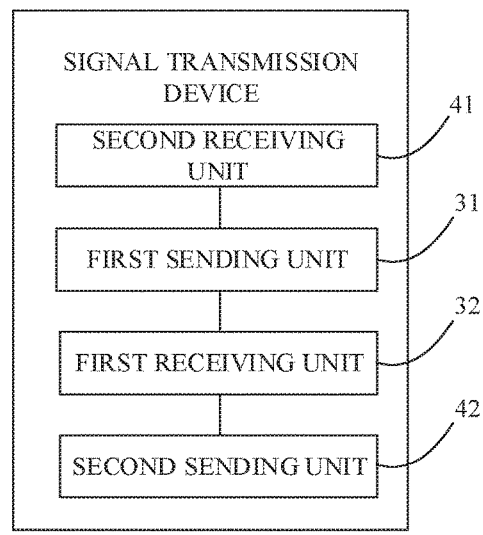
FIG. 4 is a schematic structural diagram of another signal transmission device according to an embodiment of the present disclosure.

Furthermore, as shown in FIG. 4, the device further comprises a second receiving unit 41.

The second receiving unit 41 is used in the second antenna, and receives the GSM high-frequency signal sent by the GSM transceiver.

The first sending. unit 31 is used in the GSM transceiver, and sends the GSM low-frequency signal to the first antenna via a first low-pass filter, a power amplifier, a second low-pass filter, a third low-pass filter and a frequency divider in sequence.

A total of the spurious power corresponding to the GSM transceiver, the insertion loss power corresponding to the first low-pass filter, the gain corresponding to the power amplifier, the insertion loss power corresponding to the second low-pass filter, the insertion loss power corresponding to the third low-pass filter and the isolation corresponding to the frequency divider is less than or equal to a first preset power.

A total of the spurious power corresponding the power amplifier, the insertion loss power corresponding to the second low-pass filter, the insertion loss power corresponding to the third low-pass filter and the isolation corresponding to the frequency divider is less than or equal to a second preset power.

Optionally, as shown in FIG. 4, the device further comprises a second sending unit 42.

The second sending unit 42 is used in the first antenna, and sends the GNSS signal to a GNSS receiver via the frequency divider, a high-pass filter, a first bandpass filter, a low-noise amplifier and a second bandpass filter in sequence.

The signal transmission device according to the embodiment of the present disclosure is applied to the signal transmission system which comprises the first antenna and the GSM transceiver. The GSM transceiver sends a GSM low-frequency signal to the first antenna, and the first antenna receives a GNSS signal and the GSM low-frequency signal sent by the GSM transceiver. In contrast with the prior antennas for receiving GNSS signals and GSM signals, in the embodiment of the present disclosure, the GSM transceiver sends GSM low-frequency signals to the first antenna, while the first antenna can simultaneously receive GNSS signals and GSM low-frequency signals. That is to say, the antenna for receiving GNSS signals and the antenna for sending and receiving GSM low-frequency signals are coupled as one antenna, while the antenna for sending and receiving GSM high-frequency signals is another antenna, thereby avoiding interference problem due to receiving signals of adjacent frequency bands such as GNSS signals, GSM high-frequency signals and so on by using one antenna, and in turn improving the reliability of receiving a signal.

Furthermore, in the signal transmission device according to the embodiment of the present disclosure, by means of adding the first low-pass filter, the power amplifier, the second low-pass filter and the third low-pass filter after the GSM transceiver and setting the insertion loss of these elements in the GNSS signal frequency band, the user equipment enables the spurious power corresponding to the spurious signals at the common terminal of the frequency divider to be less than the preset power, thereby avoiding the interference of spurious signals with GNSS signals, and in turn, further improving the reliability of receiving a signal. The first antenna receives GNSS signals and GSM low-frequency signals, thereby avoiding failing to perform division on received signals of similar frequencies due to simultaneously receiving the signals, and in turn, preventing GNSS signals received by the user equipment from carrying much interference signals, thereby further improving the reliability of receiving a signal. By means of the design for inhibiting spurious signals and fundamental waves, the user equipment can solve the spurious signal interference and the fundamental wave interference caused by the GSM receiver sending GSM signals, that is to say, the GNSS receiver can receive GNSS signals without interference, thereby further improving the reliability of receiving a signal.

It should be noted that, other description for each unit in the signal transmission device according to the embodiments of the present disclosure may be conceived with reference to the description corresponding to FIG. 1 and FIG. 2, and is not repeated herein.

Figure 5:
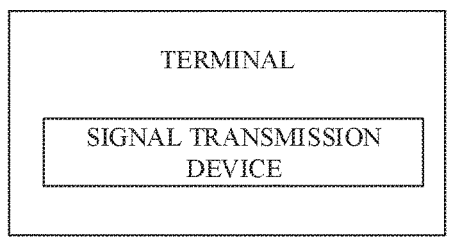
FIG. 5 is a schematic structural diagram of a terminal according to an embodiment of the present disclosure.

A terminal is further provided by an embodiment of the present disclosure. As shown in FIG. 5, the terminal comprises the aforementioned signal transmission device as shown in any one of FIG. 3 and FIG. 4.

The signal transmission device and the terminal according to the embodiments of the present disclosure may realize the method embodiments provided hereinbefore, while the specific description for the realization is provided in the method embodiments, and is not repeated herein. The signal transmission method and device, and the terminal according to the embodiments of the present disclosure are suitable for receiving GNSS signals and GSM low-frequency signals by using one antenna, but are not limited to it.

Persons skilled in the art may understand that all or a part of the steps in the aforementioned method embodiments can be performed by relevant hardware instructed by a computer program. The computer program may be stored in a computer-readable storage medium, and when the computer program is executed, the steps in the method embodiments may be included. The storage medium may be a magnetic disk, an optical disc, a read-only memory (ROM), or a random access memory (RAM).

The foregoing descriptions are merely embodiments of the present disclosure, but are not intended to limit the protection scope of the present disclosure. Any variations or substitutions readily figured out by persons skilled in the art within the technical scope disclosed in the present disclosure should fall within the protection scope of the present disclosure. Therefore, the protection scope of the present disclosure should be subject to the protection scope of the claims.

What is claimed is:

1. A method for signal transmission for a signal transmission system, the signal transmission system comprising a first antenna and a global system for mobile communication (GSM) transceiver, the method comprising:
    setting insertion loss of a first low-pass filter, a power amplifier, a second low-pass filter, and a third low-pass filter in a GNSS signal frequency band;
    sending, by the GSM transceiver, a GSM low-frequency signal to the first antenna via the first low-pass filter, the power amplifier, the second low-pass filter, the third low-pass filter, and a frequency divider in sequence;
    simultaneously receiving, by the first antenna, a mixed signal consisting of a global navigation satellite system (GNSS) signal and the GSM low-frequency signal sent by the GSM transceiver;
    obtaining, via the frequency divider, the GNSS signal from the mixed signal; and
    sending the GNSS signal to a GNSS receiver via a high-pass filter, a first bandpass filter, a low-noise amplifier, and a second bandpass filter in sequence.

2. The method of claim 1, wherein the signal transmission system further comprises a second antenna, the method further comprising:
    sending, by the GSM transceiver, a GSM high-frequency signal to the second antenna; and
    receiving, by the second antenna, the GSM high-frequency signal sent by the GSM transceiver.

3. The method of claim 1, wherein a first total of spurious power corresponding to the GSM transceiver, insertion loss corresponding to the first low-pass filter, gain corresponding to the power amplifier, insertion loss corresponding to the second low-pass filter, insertion loss corresponding to the third low-pass filter, and isolation corresponding to the frequency divider is less than or equal to a first preset power; and
    a second total of spurious power corresponding the power amplifier, insertion loss corresponding to the second low-pass filter, insertion loss corresponding to the third low-pass filter, and isolation corresponding to the frequency divider is less than or equal to a second preset power.

4. The method of claim 3, wherein the first preset power is a maximum power of spurious signals of a GSM system that interfere with the GNSS signal, and wherein the second preset power is a maximum power of spurious signals with a GNSS frequency band generated by the power amplifier in a GSM low-frequency transmission channel and that cannot interfere with the GNSS signal at a common terminal of the frequency divider.

5. The method of claim 1, wherein the GNSS signal comprises a Global Positioning System (GPS) signal.

6. The method of claim 1, wherein the method further comprises:
    obtaining, via the frequency divider, the low-frequency GSM signal from the mixed signal; and
    sending the first low-frequency GSM signal to the GSM transceiver via the third low-pass filter.

7. A device for signal transmission for a signal transmission system, the signal transmission system comprising a first antenna, a second antenna, and a global system for mobile communication (GSM) transceiver, the device comprising:
    a first sending unit used in the GSM transceiver and configured to send a GSM low-frequency signal to the first antenna via a first low-pass filter, a power amplifier, a second low-pass filter, a third low-pass filter, and a frequency divider in sequence;

a first receiving unit in the first antenna and configured to simultaneously receive a global navigation satellite system (GNSS) signal and the GSM low-frequency signal sent by the GSM transceiver;

a second sending unit used in the first antenna and configured to send the GNSS signal to a GNSS receiver via the frequency divider, a high-pass filter, a first bandpass filter, a low-noise amplifier, and a second bandpass filter in sequence; and a second receiving unit used in the second antenna and configured to receive a GSM high-frequency signal sent by the GSM transceiver.

8. The device of claim 7, wherein the GNSS signal comprises a Global Positioning System (GPS) signal, and wherein the first sending unit is further configured to send the GSM high-frequency signal to the second antenna.

9. The device of claim 7, wherein
a first total of spurious power corresponding to the GSM transceiver, insertion loss corresponding to the first low-pass filter, gain corresponding to the power amplifier, insertion loss corresponding to the second low-pass filter, insertion loss corresponding to the third low-pass filter, and isolation corresponding to the frequency divider is less than or equal to a first preset power; and
a second total of spurious power corresponding the power amplifier, insertion loss corresponding to the second low-pass filter, insertion loss corresponding to the third low-pass filter, and isolation corresponding to the frequency divider is less than or equal to a second preset power.

10. The device of claim 9, wherein the first preset power is a maximum power of spurious signals of a GSM system that interfere with the GNSS signal, and wherein the second preset power is a maximum power of spurious signals with a GNSS frequency band generated by the power amplifier in a GSM low-frequency transmission channel and that cannot interfere with the GNSS signal at a common terminal of the frequency divider.

11. The device of claim 7, wherein insertion loss of the first low-pass filter, the power amplifier, the second low-pass filter, and the third low-pass filter is set in a GNSS signal frequency band.

12. A terminal comprising a device for signal transmission for a signal transmission system, the terminal comprising a first antenna, a second antenna, and a global system for mobile communication (GSM) transceiver, the device comprising:

a first sending unit used in the GSM transceiver and configured to send a first GSM low-frequency signal to the first antenna via a first low-pass filter, a power amplifier, a second low-pass filter, a third low-pass filter, and a frequency divider in sequence;

a first receiving unit in the first antenna and configured to receive a global navigation satellite system (GNSS) signal and the first GSM low-frequency signal sent by the GSM transceiver;

a second sending unit used in the first antenna and configured to send the GNSS signal to a GNSS receiver via the frequency divider, a high-pass filter, a first band pass filter, a low-noise amplifier, and a second band pass filter in sequence; and a second receiving unit used in the second antenna and configured to receive a GSM high-frequency signal sent by the GSM transceiver, wherein the first antenna can simultaneously send a second GSM low-frequency signal and receive at least one of the GNSS signal or the first GSM low-frequency signal.

13. The terminal of claim 12, wherein the GNSS signal comprises a Global Positioning System (GPS) signal, and wherein the first sending unit is further configured to send the GSM high-frequency signal to the second antenna.

14. The terminal of claim 12, wherein
a first total of spurious power corresponding to the GSM transceiver, insertion loss corresponding to the first low-pass filter, gain corresponding to the power amplifier, insertion loss corresponding to the second low-pass filter, insertion loss corresponding to the third low-pass filter, and isolation corresponding to the frequency divider is less than or equal to a first preset power; and
a second total of spurious power corresponding the power amplifier, insertion loss corresponding to the second low-pass filter, insertion loss corresponding to the third low-pass filter, and isolation corresponding to the frequency divider is less than or equal to a second preset power.

15. The terminal of claim 14, wherein the first preset power is a maximum power of spurious signals of a GSM system that interfere with the GNSS signal, and wherein the second preset power is a maximum power of spurious signals with a GNSS frequency band generated by the power amplifier in a GSM low-frequency transmission channel and that cannot interfere with the GNSS signal at a common terminal of the frequency divider.

16. The terminal of claim 12, wherein insertion loss of the first low-pass filter, the power amplifier, the second low-pass filter, and the third low-pass filter is set in a GNSS signal frequency band.

17. The terminal of claim 12, wherein the first antenna can simultaneously send a second GSM low-frequency signal, receive the GNSS signal, and receive the first GSM low-frequency signal.

* * * * *